United States Patent
Clarissou

(10) Patent No.: US 8,881,657 B2
(45) Date of Patent: Nov. 11, 2014

(54) METHOD AND DEVICE FOR LOCKING A SYSTEM FOR GUIDING A GUIDED VEHICLE

(75) Inventor: Yves Clarissou, Paris (FR)

(73) Assignee: Siemens SAS, St. Denis (FR)

( * ) Notice: Subject to any disclaimer, the term of this patent is extended or adjusted under 35 U.S.C. 154(b) by 190 days.

(21) Appl. No.: 13/383,921

(22) PCT Filed: Aug. 6, 2009

(86) PCT No.: PCT/EP2009/060179
§ 371 (c)(1),
(2), (4) Date: Jan. 13, 2012

(87) PCT Pub. No.: WO2011/006545
PCT Pub. Date: Jan. 20, 2011

(65) Prior Publication Data
US 2012/0111223 A1    May 10, 2012

(30) Foreign Application Priority Data
Jul. 13, 2009   (EP) .................................... 09290562

(51) Int. Cl.
*B61B 12/02* (2006.01)
*B62D 3/00* (2006.01)
*B61F 9/00* (2006.01)
*B62D 1/26* (2006.01)

(52) U.S. Cl.
CPC .. *B61F 9/00* (2013.01); *B62D 1/265* (2013.01)
USPC .......................................... 104/245; 180/400

(58) Field of Classification Search
CPC ............. B60M 1/34; B62D 3/00; B62D 3/02; B62D 5/02; B62D 5/06; B62D 5/061; E01B 5/00; E01B 5/02; E01B 5/18

USPC ................. 104/140, 145, 242, 243, 245, 246; 180/400, 417, 418

See application file for complete search history.

(56) References Cited

U.S. PATENT DOCUMENTS

| | | | |
|---|---|---|---|
| 6,363,860 B1 | 4/2002 | Andre | |
| 7,891,303 B2 | 2/2011 | Dupont et al. | |
| 2008/0083345 A1* | 4/2008 | Morita et al. | 104/106 |
| 2010/0065692 A1 | 3/2010 | Andre | |

FOREIGN PATENT DOCUMENTS

| | | |
|---|---|---|
| FR | 2 741 582 A1 | 5/1997 |
| FR | 2 778 161 A1 | 11/1999 |
| FR | 2 860 480 A1 | 4/2005 |
| FR | 2 909 061 A1 | 5/2008 |

* cited by examiner

*Primary Examiner* — R. J. McCarry, Jr.
(74) *Attorney, Agent, or Firm* — Laurence A. Greenberg; Werner H. Stemer; Ralph E. Locher

(57) ABSTRACT

A method and device lock a guiding system of a vehicle guided by at least one rail. The locking device includes first and second cylinders combined with guiding devices belonging to the guiding system of a steering axle. Each of the cylinders contains at least two characteristic configuration states: a first configuration state placing the guiding device with which the cylinder is combined in a first guiding state, and a second configuration state placing the guiding device with which the cylinder is combined in a second guiding state. A power supply supplies power to the cylinders to switch the configuration state. The power supply is coupled with a rotary member, the rotation of which is mechanically linked to the movement of the vehicle, such that a change in the direction of rotation of the rotary member is transmitted to the power supply and switches the configuration state of the cylinders.

18 Claims, 2 Drawing Sheets

METHOD AND DEVICE FOR LOCKING A SYSTEM FOR GUIDING A GUIDED VEHICLE

BACKGROUND OF THE INVENTION

Field of the Invention

The present invention relates to a method and a device for locking a guiding system of a vehicle guided by at least one rail according to the preamble of claims 1 and 9.

In particular, the invention relates to the automatic blocking or locking of a bidirectional guiding system for a guided vehicle. The term "guided vehicle" refers to means of public transport, such as buses, trolleybuses, tramways, subways, trains or train units, etc., the movement of which is guided by means of at least one guide rail which directs each of the steering axles of said vehicle, in particular via a guiding device mounted on each of said steering axles. In particular, said guided vehicle is a vehicle mounted on tires, using steering power of the tires to take over the lateral forces related to vehicle dynamics.

One example of a guiding device is a single or double arm connected to said axle in the manner of a drawbar and extending toward the guide rail, said arm bearing, for example at its free extremity, a pair of guide rollers positioned in order to roll along the rail whilst enclosing the rail and gripping it, in order to follow the trajectory described by the rail. For reasons of stability and reliability, the guiding device precedes the steering axle during their movement. Thus, if the guided vehicle operates according to a single direction of travel, i.e. the wheels of said vehicle always rotate in the same direction, then said guiding device is situated in front of the steering axle with respect to its movement along the trajectory described by the rail. If the route resulting from said trajectory does not include loops permitting the vehicle to make a U-turn in order to follow the same route in the reverse direction, then the vehicle must be able to operate in two directions of travel corresponding respectively to two directions of rotation of the wheels of the vehicle and permitting said vehicle to travel the same route in a first direction, and then in a second direction, the first direction being the reverse of the second direction.

In this case, the guiding device must be duplicated on each steering axle by a similar guiding device facing in the reverse direction, such that each of the two directions of travel is associated with a guiding device which, on each occasion, precedes the steering axle during its movement along the trajectory described by the rail. The two guiding devices, arranged on either side of the steering axle in opposing directions, form a guiding system characterized as being bidirectional. Each of the guiding devices forming the bidirectional guiding system is thus utilized alternately according to the direction of movement of the vehicle such that it is always a guiding device situated in front of the steering axle, with respect to its movement, which guides said steering axle.

For this reason each guiding device forming the bidirectional guiding system generally presents two guiding states corresponding to two modes of operation, said guiding states being controlled by a locking device:

- a first, active guiding state, corresponding to a steering mode of the guiding device, characterized by a rigid configuration of said guiding device, resulting in particular from a locking of the linkage and thus ensuring precise guidance of said vehicle,
- a second, passive guiding state, corresponding to a tracking mode of the guiding device, characterized by a free configuration of said guiding device and resulting in particular from complete freedom of movement of the linkage, which no longer has any influence on the guiding of the vehicle.

Thus, according to the direction of movement of said guided vehicle, the guiding device in front of one of said steering axles is in a steering mode, whilst the other, i.e. the rear guiding device, is in tracking mode, such that the vehicle is guided by one and only one of the two guiding devices. When the direction of movement of the vehicle is reversed, the guiding device which was previously in the steering mode becomes the guiding device situated behind the axle relative to the movement of the vehicle, and will consequently operate in tracking mode. Conversely, the guiding device which previously operated in tracking mode is then situated in front of said steering axle, and will therefore operate in steering mode. Thus, when the direction of travel of the guided vehicle—which cannot make a U-turn on its route—is reversed, the operating modes relative to the guiding devices forming the bidirectional guiding system are themselves also reversed, i.e. the steering guiding device becomes the tracking guiding device, and the tracking guiding device becomes the steering guiding device, each time the guided vehicle changes direction.

Thus, for example, locking devices for bidirectional guiding systems are also known, including:

- a device for supplying pneumatic, hydraulic, or electrical power, suitable for supplying pneumatic, hydraulic or electrical power respectively to at least one cylinder, with single or double rod, said cylinder being suitable for locking or releasing the guiding device, in order to make it operate in steering mode, or respectively in tracking mode,
- a movement reading device suitable for determining and communicating information characterizing the direction of movement of said vehicle,
- a power control device suitable for controlling the power supply, provided by said supply device, to each of said cylinders according to said information characterizing the direction of movement of the vehicle,
- a control device suitable for ascertaining consistency between the direction of movement of the guided vehicle and the operating mode of each of the guiding devices forming the guiding system.

Unfortunately, the current locking devices for guiding systems connected to guided vehicles are cumbersome, bulky and relatively complex. Moreover, they can generate errors relating to the control of the steering or tracking mode of the guiding devices, which may cause dangerous situations resulting in a loss of trajectory of the guided vehicle.

BRIEF SUMMARY OF THE INVENTION

One object of the present invention is to provide a method and a device for locking a bidirectional guiding system for a guided vehicle which are simple, compact, inexpensive, and—moreover—reliable and safe.

With this object in mind, a device and a method are proposed by the content of claims 1 and 9.

A set of subclaims likewise presents the advantages of the invention.

Starting with a method for locking a guiding system, in particular a bidirectional guiding system, of a vehicle guided by at least one rail, including:

- a first and a second cylinder combined respectively with a first and second guiding device belonging to the guiding system of a steering axle of the guided vehicle, said guiding devices in particular being similar and immovably attached to said steering axle and positioned in opposing directions on either side of said steering axle, at least a first and second configuration state of said cylinders placing their respective guiding devices in a first and a second guiding state respectively, said first guiding state permitting said steering axle to be directed, and said second guiding state permitting the guiding device freely to follow the direction of said steering axle, a power supply for said cylinders from a power supply device, supplying in particular pneumatic, hydraulic or electrical power, in order to switch the configuration state of each cylinder, the method according to the invention is characterized in that it includes:

a coupling of the supply device to at least one rotary member the rotation of which is mechanically linked to the movement of the vehicle, for example a driving or non-driving wheel of the vehicle, in particular such that the operation of said supply device is directly coupled to the rotation of said rotary member, a switching of the power supply to said cylinders causing the configuration state of said cylinders to be switched according to a change in the direction of said rotation of said rotary member, said change being transmitted to the supply device by means of said coupling.

In particular, the locking method according to the invention is characterized by control, in particular by a control device, of the configuration state of each of said cylinders in order to ensure the correct operation of said cylinders, consistently with the vehicle's direction of movement. Advantageously, the direction of rotation of said rotary member is directly linked to the direction of movement of said guided vehicle. Indeed, said rotary member is characterized by two directions of rotation corresponding to the two possible directions of movement of said guided vehicle. Thus a first direction of rotation of said rotary member corresponds to a first direction of movement of said guided vehicle, whereas the second direction of rotation of said rotary member, i.e. the opposite direction to said first direction of rotation, corresponds to a movement of said guided vehicle according to the second direction of movement, said second direction of movement being the opposite direction of movement to said first direction of movement. Thus the method according to the invention intrinsically guarantees consistency between the direction of movement of the vehicle and the configuration state of the cylinders. As a result, said control of the configuration state of the cylinders is free from direct verification of said consistency, yet—on the contrary—has as its primary and immediate objective the detection and prevention of breakdowns in the locking device, such as—for example—the seizure of a cylinder, or a decrease in pressure in a hydraulic circuit. The consistency between the direction of rotation of said rotary member and the configuration state of said cylinders is, however, verified solely and indirectly via the control of the configuration state of said cylinders.

Advantageously, the locking method according to the invention is characterized in particular by production of the power necessary for the power supply to said cylinders depending on the mechanical rotary power created by the rotation of said rotary member. In particular, said production is dependent on said mechanical rotary power in that the latter is for example:

used in order to create a control signal dependent on the direction of rotation of said rotary member and transmitted by means of said coupling to said supply device in order to cause said switching of the power supply, said control signal being thus suitable for controlling the production of said power according to said direction of rotation of said rotary member;

transmitted to said supply device by means of said coupling, then directly transformed, in particular by the supply device, into power for said cylinders, said transformation of mechanical rotary power into power for said cylinders permitting—according to the direction of rotation of said rotary member—said switching of the power supply.

Advantageously, said coupling may then be a mechanical coupling transmitting said mechanical rotary power, as well as changes in the direction of rotation of said rotary member, to said supply device, which may comprise—for example—an alternator or a hydraulic pump activated by said rotation of said rotary member by means of said coupling, or even—in a non-restrictive manner—an electrical coupling, in order to transmit said order signal to said supply device. Said control signal is in particular a binary signal having two values: a first value characterizing a first direction of movement of the guided vehicle, and a second value characterizing a second direction of movement, opposite to said first direction, of the guided vehicle. The supply device supplies power, according to the value of said control signal, to the cylinders of the guiding device situated in front of a steering axle, such that a change in said signal value causes said switch in the power supply, the supply device in turn being able to be rigidly coupled to the rotary organ in order to produce said power by transformation of the mechanical rotary power.

Furthermore, the method according to the invention advantageously permits an energy self-sufficient locking device to be obtained in the particular case in which the mechanical rotary power supplied by said rotary member is the only power used for operating said locking device. In this case, the rotation of said rotary member is the sole power source of said locking device which becomes energy self-sufficient. An illustration of an energy self-sufficient locking device is for example the influence on a rotary pump by the rotational movement of the rotary member: said rotary member transmits—by means of a mechanical coupling via the drive shaft—its rotational movement, i.e. its rotation, to a rotational axis of the rotary pump, said rotary pump being connected to at least two supply circuits: a first circuit linking a first output from said pump to the cylinder of a first guiding device of a steering axle, and a second output connected to the cylinder of a second guiding device of the same steering axle, but facing the opposite direction to said first guiding device, said pump automatically supplying—according to the direction of rotation of said rotary member—only the supply circuit of the guiding device situated in front of the steering axle with reference to the direction of movement of said vehicle.

Advantageously, such an energy self-sufficient locking device is free of a movement reading device, a power control device and any power source other than the rotation of said rotary member.

Advantageously, the locking method according to the invention is characterized in particular in that said rotary member is a wheel used for movement of said vehicle. In a similar manner to the example previously described and illustrating an energy self-sufficient locking device, the rotation of the wheel is for example transmitted by means of a shaft coupling to a pump, in particular a reversible pump such as a reversible rotary hydraulic pump, included in said supply device and suitable for producing said power necessary for the power supply to said cylinders from the mechanical rotary power of the wheel. For a first direction of rotation of the wheel corresponding to a first direction of movement of the vehicle, said reversible pump provides hydraulic power to the cylinders permitting the locking of the linkage of the front guiding device, and consequently ensuring the accurate guiding of said vehicle, whilst at the same time the other cylinders, connected to the rear guiding device, are in a configuration state permitting the guiding device freely to follow the direction of the steering axle. For the second direction of rotation of the wheel corresponding to a direction of movement opposite to said first direction of movement of said vehicle, the reversible pump operates in the reverse manner such that it switches the power supply of the cylinders, i.e. the cylinders which previously ensured the rigidity and the locking of the linkage are released, and the cylinders which previously permitted free steering of the guiding device are supplied with power such that the guiding device situated in front of the steering axle in relation to the movement of the vehicle is the guiding device which steers the vehicle.

In particular and advantageously, any change of said direction of rotation of said rotary member automatically and directly induces said switching of said states of configuration of said cylinders. Indeed, a change in the direction of rotation of said rotary member directly and automatically causes, by coupling, said switching of the power supply to said cylinders by said supply device, such that the cylinders connected to the front guiding device are supplied with power and the cylinders connected to the rear guiding device are disconnected from the power supply, said power disconnection placing said cylinders connected to the rear guiding device in said second guiding state, which has the effect of releasing the linkage. In a particularly advantageous manner, said switching of the power supply to said cylinders is effected by said pump according to said direction of rotation of said rotary member, ensuring direct consistency between the power supply to said cylinders and the direction of movement of the guided vehicle.

Starting with a device for locking a guiding system, in particular a bidirectional guiding system, of a vehicle guided by at least one rail, including:
- a first and a second cylinder, in particular with single or double rod, connected or in particular firmly secured respectively to a first and a second guiding device belonging to the guiding system of a steering axle of the guided vehicle, each of said cylinders including at least two characteristic configuration states: a first configuration state placing the guiding device to which the cylinder is connected (or firmly secured) in a first guiding state permitting said steering axle to be directed, and a second configuration state placing the guiding device to which the cylinder is connected (or firmly secured) in a second guiding state permitting the guiding device freely to follow the direction of said steering axle,
- a power supply device, in particular for supplying pneumatic, hydraulic or electrical power, suitable for supplying power to said cylinders in order to switch the configuration state of each of said cylinders, the locking device according to the invention being characterized in that
  the supply device is coupled, by means of a coupling member, to at least one rotary member the rotation of which is mechanically linked to the movement of the vehicle such that a change in direction of rotation of said rotary member is transmitted to said supply device by said coupling member and causes a switching of the configuration state of said cylinders.

The locking device according to the invention is characterized in particular in that the said supply device is suitable for automatically switching said configuration state of said cylinders when the rotation of said rotary member changes direction, such that the locking device automatically locks in a steering mode the front guiding device, i.e. the one situated in front of the steering axle in respect of the movement of the vehicle. Indeed, a change in the direction of rotation of said rotary member automatically causes the power supply to said cylinders to be switched by said supply device and, therefore, causes a configuration of the front guiding device in steering mode and of the rear device in tracking mode.

Moreover, the locking device according to the invention is characterized in particular in that a control device is suitable for verifying the configuration state of each of said cylinders in order to ensure correct operation of said cylinders consistently with a direction of movement of the vehicle. Advantageously, said control device permits a breakdown in a cylinder to be detected, for example by means of at least one sensor of a position of the cylinder rod.

On the other hand, the locking device according to the invention is characterized in particular in that the supply device is suitable for producing the power for said cylinders according to a mechanical rotary power created by the rotation of said rotary member. In particular, the supply device is for example suitable for:
- transforming said mechanical rotary power, created by the rotation of said rotary member, into said power for supplying said cylinders, such that said power production is the result of a power transformation;
- producing the power for said cylinders according to a control signal created from said mechanical rotary power, transmitted by said coupling member and dependent on the direction of rotation of said rotary member.

The mechanical rotary power, for example, is transformed into hydraulic or electrical power which, according to the direction of said rotation, supplies power to the cylinder of the locking device situated in front of the steering axle, and releases the cylinder of the rear locking device, thus permitting the switching of the configuration state of the cylinders connected to the vehicle guiding system when the direction of rotation of the rotary member is reversed, i.e. when the direction of movement of the vehicle is reversed.

In the particular case in which the supply device includes a reversible pump, such as a reversible rotary hydraulic pump, said reversible pump is suitable for being directly influenced by said rotation of said rotary member, which may, in an advantageous manner, simply be a wheel used for the movement of said vehicle, such that the mechanical rotary power is transformed into hydraulic power. In particular, according to the direction of rotation of the rotary member, the reversible pump will pressurize a hydraulic circuit connected to the cylinder belonging to the front guiding device, such that said cylinder is in a configuration state permitting said guiding device to be in steering mode, whilst the rear guiding device will at the same moment be in tracking mode because, for example, the circuit supplying its cylinder with hydraulic power is not pressurized. In this way, said reversible pump is suitable for automatically switching said configuration states of said cylinders according to said direction of rotation of said rotary member.

Finally, the locking device according to the invention is characterized, in particular, in that a control system is suitable for communicating with each of said control devices equipping each axle in order to signal, in particular to a control post or to the driver of said guided vehicle, a malfunction in a guiding device, said malfunction possibly resulting in inconsistency between the direction of movement of said vehicle and the configuration state of said cylinders.

Exemplary embodiments and applications are provided with the help of the following diagrams:

DESCRIPTION OF THE INVENTION

Figure 1:
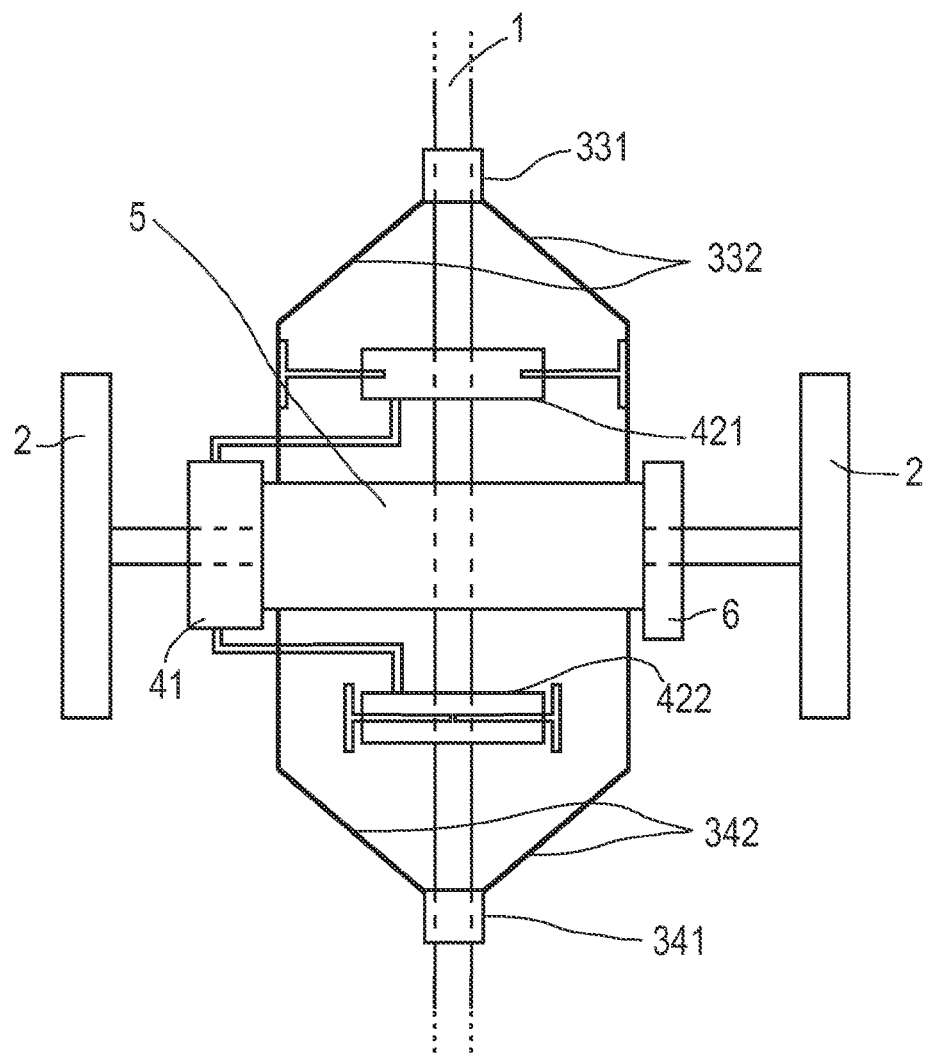
FIG. 1: Exemplary embodiment of a device for locking a bidirectional guiding system according to the invention.

By way of example, FIG. 1 shows a device for locking a bidirectional guiding system of a vehicle guided by at least one rail 1, including:

- a first and a second cylinder 421, 422, in particular with single or double rod, connected or in particular firmly secured, respectively to a first and a second guiding device 331, 332, 341, 342 belonging to the guiding system of a steering axle 5 of the guided vehicle, each of said cylinders 421, 422 comprising at least two characteristic configuration states: a first configuration state placing the guiding device to which the cylinder is connected (or firmly secured) in a first guiding state permitting said steering axle to be directed, and a second configuration state placing the guiding device to which the cylinder is connected (or firmly secured) in a second guiding state permitting the guiding device freely to follow the direction of said steering axle,
- a power supply device 41, in particular supplying pneumatic, hydraulic or electrical power, suitable for supplying power to said cylinders 421, 422 in order to switch the configuration state of each of said cylinders 421, 422, characterized in that
- the supply device 41 is coupled, by means of a coupling member, to at least one rotary member 2 the rotation of which is mechanically linked to the movement of the vehicle, such that a change in direction of rotation of said rotary member 2 is transmitted to said supply device by said coupling member and causes a switching of the configuration state of said cylinders.

In particular, the supply device 41 includes a means of power transformation connected to said cylinders, suitable for transforming the mechanical rotary power of the rotary member into power suitable for permitting mechanical work of said cylinders, said mechanical work being used in particular to rigidify the drawbar of the steering guiding device, thus permitting the axle to be steered according to the direction defined by the trajectory of the rail. In particular, said means of power transformation is connected to said cylinders and coupled, by said coupling member, to said rotary member 2. Said means is, for example, an alternator suitable for supplying electrical power used for switching the configuration state of electrical cylinders, or a pneumatic or hydraulic pump used for pressurizing respectively the pneumatic or hydraulic cylinders connected to said pump, such that the pressurized cylinder is in a state suitable for permitting said guiding device to direct the steering axle, and the cylinder free of pressurization guarantees complete freedom of movement of the linkage of the tracking guiding device.

Moreover, a control device 6 verifies the configuration state of each of said cylinders 421, 422 in order to ensure correct operation of said cylinders 421, 422 consistently with a direction of movement of the vehicle. The control device verifies, for example, an internal pressure on the cylinder according to a movement of the cylinder rod.

Figure 2:
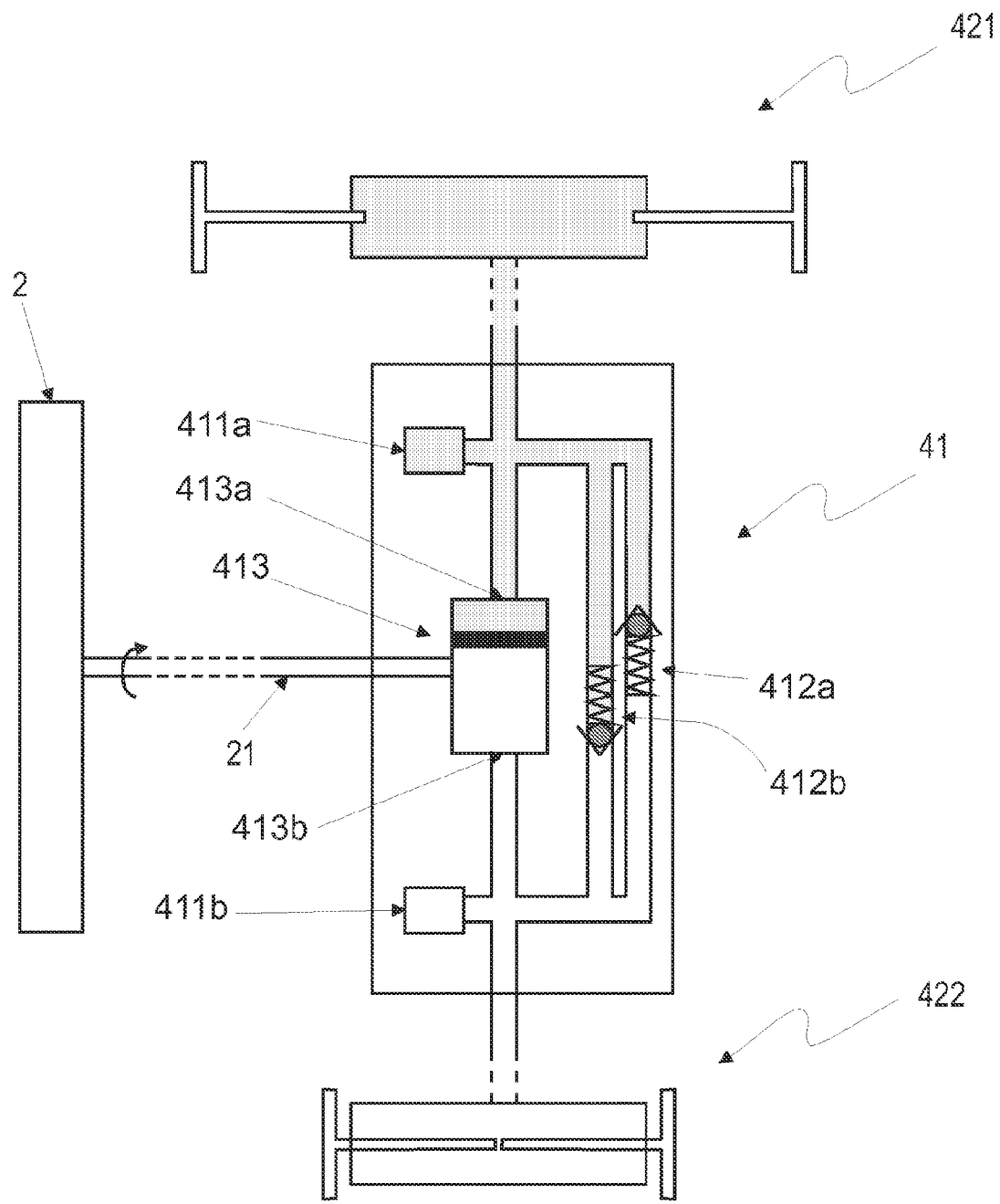
FIG. 2: Exemplary embodiment of a power supply device according to the invention.

FIG. 2 shows an exemplary embodiment of the power supply device 41 according to the invention. Said supply device includes in particular a reversible pump 413 including two outputs 413*a*, 413*b* used for supplying power respectively to two cylinders 421, 422 by means of a first and a second power circuit respectively. Said reversible pump 413 of the power supply device 41 is, for example, influenced by a wheel 2 of the vehicle by coupling by means of a drive shaft 21 suitable for transmitting the mechanical rotary power of the wheel 2 to the reversible pump 413. Said reversible pump 413 is suitable for transforming this mechanical rotary power into hydraulic or hydrostatic power, which supplies one of the two cylinders for one direction of rotation of said wheel 2, and the other of the two cylinders for the other direction of rotation of said wheel 2. Indeed, for one direction of rotation of the wheel 2, said reversible pump 413 supplies power to one and one only of said cylinders 421, 422 which is then in a configuration state (working) permitting the guiding device to which it is connected to direct the steering axle. During this time, the other of said cylinders is in a configuration state (resting) permitting the guiding device to which it is connected freely to follow the direction of said steering axle. When the direction of rotation of the wheel changes, the configuration state of said cylinders is reversed or in other words switched, such that the cylinder which was in a working state is in a resting state and vice versa.

For example, for a first direction of rotation of said wheel 2, the reversible pump 413 is suitable for supplying power to a first output 413*a* connected by means of a first circuit to a first cylinder 421, such that said first cylinder is associated with this first direction of rotation of the wheel. It may in particular supply said output 413*a* with a fluid under pressure. For this purpose, said fluid is pumped from the second circuit via the second output 413*b* toward the first circuit via the first output 413*a*. In particular, the fluid from the circuit connected to the cylinder of which the configuration state (resting) permits the guiding device to which it is connected freely to follow the direction of said steering axle, i.e. in our example the fluid of the second circuit is a fluid at low pressure. The reversible pump is then suitable for pressurizing this fluid at low pressure, such that it is re-injected under higher pressure into the first circuit via said first output 413*a*. Moreover, said first circuit includes at least one hydraulic accumulator 411*a* and a pressure limiting unit 412*a*. In particular, said pressure limiting unit 412*a* links said first circuit, in a high-pressure state, to said second circuit, in a low-pressure state, such that excess pressure in said first circuit is diverted toward said second circuit. In other words, the excess pressurized fluid in the first circuit is re-injected via the pressure limiting unit 412*a* into the second circuit.

Conversely, for the second direction of rotation of said wheel 2, the reversible pump 413 operates in the reverse manner. In other words, the reversible pump is suitable for supplying power to the second output 413*b* connected by means of the second circuit to the second cylinder 421, such that said second cylinder is associated with this second direction of rotation of the wheel. In particular, it will supply said second output 413*b* with a fluid at high pressure, which it will have drawn via the first output 413*a* in said first circuit in which it was in a low-pressure state, and then will have pressurized in order to inject it into said second circuit. Moreover, similarly to the first circuit, said second circuit includes at least one hydraulic accumulator 411*b* and a pressure limiting unit 412*b* suitable for linking said second circuit, in a high-pressure state, to said first circuit, in a low-pressure state, such that excess pressure of said second circuit is diverted toward said first circuit via said pressure limiting unit. In other words, the excess pressurized fluid from the second circuit is re-injected via the pressure limiting unit 412*b* in the first circuit.

In general, said fluid under high pressure is suitable for use by one of the two cylinders in order to accomplish a mechanical working used to switch its configuration state to a configuration state permitting the guiding device to direct the steering axle. Moreover, when the wheel continues to rotate in the same direction, the fluid in one of said circuits continues to be pressurized by the reversible pump, and, consequently, the hydraulic or pneumatic power supply to the cylinder connected to the circuit of which the fluid is under high pressure is itself also continued. Advantageously, the excess pressure is continuously diverted from the high-pressure circuit toward the low-pressure circuit by at least one of the pressure limiting units interconnecting the high-pressure circuit with the low-pressure circuit. Thus, when rotation is continuously in the same direction, once a pressure limit is reached—said pressure limit being defined by the pressure limiting unit—any new quantity of fluid injected into the high-pressure fluid circuit will be equal to the quantity of excess fluid which the pressure limiting unit will divert toward the low-pressure circuit, such that equilibrium will be achieved between fluid injected into the pressurized circuit and fluid diverted from the pressurized circuit.

Advantageously, according to the direction of rotation of the wheel, the pressure limiting unit connected to the pressurized circuit includes a mechanism enabling the pump to be disengaged as soon as a pressure has achieved the level of said pressure limit and, conversely, enabling the pump to be kept active until such time as said pressure limit is reached.

In summary, the method and the device according to the invention present several advantages compared to existing methods and devices, in that:

- they dispense with the need to use the power supply control device and the movement reading device, given that, by the coupling of the supply device with said rotary member, the direction of rotation of the rotary member—and, therefore, the direction of movement of said vehicle—directly controls the power supply to said cylinders consistently with the direction of movement of said vehicle;
- they avoid control errors in the supply device or reading errors in the reading device, whilst guaranteeing consistency between the direction of movement of the vehicle and the configuration of said cylinders starting with the direct coupling of the rotary organ and the supply device, such that the method and the device according to the invention are reliable and safe from the point of view of consistency between the movement of the vehicle and the power supply to the cylinder connected to the front guiding device;
- they dispense with the need for external power to be supplied to the locking device, such as for example a power input coming from an engine used to produce hydraulic power necessary for the operation of hydraulic cylinders;
- they permit the automatic locking of the front guiding device, simultaneously with the automatic unlocking of the rear guiding device, the terms "front" and "rear" referring to the position of the guiding devices with reference to the steering axle when the vehicle is moving;
- they guarantee a compact design and a simple embodiment of the locking device.

The invention claimed is:

1. A method for locking a guiding system of a vehicle guided by at least one rail, which comprises the steps of:
   connecting a first and a second cylinder with, respectively, a first and a second guiding device belonging to the guiding system of a steering axle of the vehicle, the cylinders having at least one first and second configuration state placing their respective guiding devices in a first and a second guiding state respectively, the first guiding state permitting the steering axle to be directed and the second guiding state permitting the respective guiding devices to freely follow the direction of the axle;
   providing a power supply to the cylinders via a supply device for switching configuration states of each of the cylinders;
   coupling the supply device to at least one rotary member, a rotation of the rotary member being mechanically linked to a movement of the vehicle; and
   a switching of the power supply of the cylinders causing the configuration state of the cylinders to be switched according to a change in direction of rotation of the rotary member, the change being transmitted by the coupling.

2. The locking method according to claim 1, wherein control of the configuration state of each of the cylinders ensures a correct operation of the cylinders consistently with a direction of movement of the vehicle.

3. The locking method according to claim 1, wherein a production of power necessary for the power supply to the cylinders is dependent on mechanical rotary power created by rotation of the rotary member.

4. The locking method according to claim 3, which further comprises transforming the mechanical rotary power into the power for supplying the cylinders.

5. The locking method according to claim 1, which further comprises providing a wheel as the rotary member used for movement of the vehicle.

6. The locking method according to claim 1, wherein a change in the direction of rotation of the rotary member induces automatically and in particular, directly the switching of the configuration states of the cylinders.

7. The locking method according to claim 1, wherein the rotation of the rotary member influences a reversible pump suitable for producing power necessary for supplying power to the cylinders.

8. The locking method according to claim 7, wherein the switching is effected by the reversible pump according to the direction of rotation of the rotary member.

9. A device for locking a guiding system for guiding a vehicle guided by at least one rail and having at least one rotary member, the device comprising:
   cylinders including a first and a second cylinder connected respectively to a first and a second guiding device belonging to the guiding system of a steering axle of the vehicle, each of said cylinders having at least two characteristic configuration states including: a first configuration state placing the guiding device to which said cylinder is connected in a first guiding state, and a second configuration state placing the guiding device to which said cylinder is connected in a second guiding state, the first guiding state permitting said steering axle to be directed and the second guiding state permitting said guiding device to freely follow the direction of said steering axle;
   a coupling member;
   a power supply device for supplying power to said cylinders to switch a configuration state of each of said cylinders, said power supply device is coupled, by means of said coupling member, to the rotary member, a rotation of the rotary member is mechanically linked to a movement of the vehicle, such that a change in direction of rotation of the rotary member is transmitted to said power supply device by said coupling member and causes a switching of the configuration state of said cylinders.

10. The locking device according to claim 9, wherein said power supply device automatically switches the configuration state of said cylinders when the rotation of the rotary member changes direction.

11. The locking device according to claim 9, further comprising a control device for verifying the configuration state of each of said cylinders to ensure correct operation of said cylinders consistently with a direction of movement of the vehicle.

12. The locking device according to claim 9, wherein said power supply device is suitable for producing power supplied to said cylinders.

13. The locking device according to claim 9, wherein said power supply device is suitable for transforming mechanical rotary power, created by the rotation of the rotary member, into power suitable for supplying to said cylinders.

14. The locking device according to claim 9, wherein said power supply device has a reversible pump.

15. The locking device according to claim 14, wherein said reversible pump is suitable for being directly influenced by the rotation of the rotary member.

16. The locking device according to claim 14, wherein said reversible pump is suitable for automatically switching the configuration states of said cylinders according to the direction of rotation of the rotary member.

17. The locking device according to claim 14, further comprising a control system for communicating with each of said control devices of each axle for signaling a malfunction in one of the guiding devices.

18. The locking device according to claim 9, wherein the rotary member is a wheel used for movement of the vehicle.

* * * * *